United States Patent
Taneja et al.

(10) Patent No.: US 12,506,542 B2
(45) Date of Patent: Dec. 23, 2025

(54) DYNAMIC LANE ASSIGNMENT FOR OPTICAL MODULES IN OPTICAL SUB-SYSTEMS

(71) Applicant: Mellanox Technologies, Ltd., Yokneam (IL)

(72) Inventors: Rahul Taneja, Banglore (IN); Alok Kumar, Banglore (IN); Mana Palai, San Jose, CA (US); Nikhil Dhar, Oakville (CA)

(73) Assignee: Mellanox Technologies, Ltd., Yokneam (IL)

( * ) Notice: Subject to any disclaimer, the term of this patent is extended or adjusted under 35 U.S.C. 154(b) by 161 days.

(21) Appl. No.: 18/380,088

(22) Filed: Oct. 13, 2023

(65) Prior Publication Data
US 2025/0125875 A1    Apr. 17, 2025

(51) Int. Cl.
*H04B 10/00*   (2013.01)
*H04B 10/40*   (2013.01)
*H04B 10/508*  (2013.01)
*H04J 14/00*   (2006.01)

(52) U.S. Cl.
CPC .......... *H04B 10/508* (2013.01); *H04B 10/40* (2013.01)

(58) Field of Classification Search
CPC .......... H04B 10/40; H04B 10/25; H04J 14/02
See application file for complete search history.

(56) References Cited

U.S. PATENT DOCUMENTS

| | | | |
|---|---|---|---|
| 10,128,970 B2* | 11/2018 | Wen et al. | H04J 14/02 |
| 10,248,607 B1* | 4/2019 | Davis et al. | G06F 13/4221 710/104 |
| 10,951,343 B2* | 3/2021 | Nagarajan | H04J 14/02 398/79 |
| 2005/0097212 A1* | 5/2005 | Engel et al. | G06F 12/16 709/230 |
| 2016/0134951 A1* | 5/2016 | Mills | H04Q 11/00 |
| 2018/0375577 A1* | 12/2018 | Leigh et al. | H04B 10/25 |
| 2023/0412265 A1* | 12/2023 | Bakopoulos et al. | H04B 10/038 |
| 2024/0273044 A1* | 8/2024 | Aburajab Tamimi et al. | G06F 13/26 |

* cited by examiner

*Primary Examiner* — Kenneth N Vanderpuye
(74) *Attorney, Agent, or Firm* — Lowenstein Sandler LLP (57) ABSTRACT

A system can include an optical interface with a first set of lanes and a processing device operatively coupled to the optical interface. The processing device can perform the operations: responsive to an optical module coupling to a port of the optical interface, determining module information from the optical module, the module information identifying a second set of lanes of the optical module. Further operations include, determining, based on the module information, a communication mode between the optical interface and the optical module and automatically assigning, based on the communication mode, a lane of the first set of lanes to a lane of the second set of lanes.

20 Claims, 8 Drawing Sheets

DYNAMIC LANE ASSIGNMENT FOR OPTICAL MODULES IN OPTICAL SUB-SYSTEMS

TECHNICAL FIELD

At least one embodiment pertains to processing resources used to perform and facilitate high-speed optical communications. For example, at least one embodiment pertains to technology for implementing dynamic lane selection for optical modules.

BACKGROUND

Communication systems transmit signals from a transmitter to a receiver via a communication channel or medium (e.g., cables, printed circuit boards, links, wirelessly, etc.) For example, the transmitter can use serial communication to transmit serial data within a serial data stream to the receiver via a serial communication channel (e.g., data sent sequentially on a per-bit basis over a single channel). As another example, the transmitter can use parallel communication to transmit parallel data within a parallel data stream to the receiver via the communication channel (i.e., multiple bits of data sent simultaneously via respective channels). Data can be encoded within a carrier wave or signal using a modulation technique. One example of a modulation technique is frequency modulation, which encodes data within a carrier signal by varying the frequency of the carrier signal. To do so, a modulator can combine the carrier signal with a data signal (i.e., baseband signal) to generate a modulated signal.

BRIEF DESCRIPTION OF DRAWINGS

Various embodiments in accordance with the present disclosure will be described with reference to the drawings, in which.

DETAILED DESCRIPTION

Embodiments described herein relate to dynamic lane selection for optical modules in optical sub-systems. Optical sub-systems couple to optical modules to facilitate optical communications. An optical module can include one or more optical lanes (e.g., optical channels). Each optical lane can be used for independent, simultaneous communication. Optical modules can be configured to communicate using various communication protocols. If the optical sub-system is not configured to communicate using the same communication protocol as the optical module, the optical sub-system will not be able to couple with the optical module, or the coupling will be impaired (e.g., data transfer speeds will be reduced). For example, one optical module configured to physically couple to the optical sub-system can support a pulse amplitude modulation (PAM) communication protocol, and another optical module configured to physically couple to the optical sub-system can support a non-return-to-zero (NRZ) communication protocol. Because each communication protocol utilizes optical lanes differently, an optical sub-system configured to communicate with the PAM communication protocol cannot communicate with an optical module configured to communicate with the NRZ communication protocol.

Some optical sub-systems can include multiple optical ports for coupling to an optical module, each optical port configured to operate a pre-defined communication protocol. However, multiple optical ports can introduce user confusion, and the potential for wasted resources of the optical sub-system (e.g., resources dedicated to the optical ports are not in use). Additionally, manual switches can be used in some optical sub-systems to manually reconfigure an optical port (e.g., with a physical switch) such that the optical port supports multiple pre-defined communication protocols. However, a manual switch introduces a point of mechanical and/or implementation failure into the process of coupling an optical sub-system to an optical device using an optical link. Additionally, some optical sub-systems can be operated in a forced speed mode that imposes a specific data transfer rate on communications between the optical sub-system and the optical module. Depending on the communication protocol, various lane configurations can be required to satisfy the specific data transfer rate. Further, some optical sub-systems can operate split ports (e.g., sub-ports). A "split port" or sub-port is a logical subdivision of the data transfer rate capabilities of an optical port of the optical sub-system. When lanes are improperly configured for a sub-port, system resources of the optical sub-system can be wasted. Additional details regarding a forced speed mode and sub-ports are described below with reference to FIGS. 2A-4.

Aspects of the present disclosure can address the deficiencies above and other challenges by implementing dynamic lane assignments for optical modules in optical sub-systems. A physical port of an optical sub-system (e.g., an optical interface) can receive and physically couple to an optical module of an optical link. Based on optical module information obtained from the optical module, the optical sub-system can assign optical lanes of the optical interface to optical lanes of the optical module. The optical module information can indicate a communication mode of the optical link and/or provide additional information about the optical lanes of the optical module. For example, the optical interface of an optical sub-system can include one or more SerDes components to be coupled to an optical module. Each SerDes component can represent one or more optical lanes of the optical interface, depending on the optical communication protocol. Once an optical module is physically coupled to the physical port of the optical sub-system, the optical interface can assign SerDes components to respective lanes of the optical module. In some embodiments, each lane of the optical module can represent a portion of an optical cable. Thus, portions of the optical cable (e.g., lanes of the optical module) can be divided, for example, spatially (e.g., physically), temporally (e.g., serial communications), by frequency, and/or by wavelength.

Advantages of the present disclosure include, but are not limited to a reduction in physical complexity of optical sub-system hardware. Removing a manual switch removes the potential for mechanical failure and the potential for human error in configuring the optical coupling between the optical sub-system and an optical module of the optical link. For example, for an optical link that is not functioning properly, troubleshooting the problem in systems with a manual switch requires verifying the mechanical integrity of the switch and/or potentially changing the physical orientation of the mechanical switch. In either scenario, an operator would need to be physically present with the optical sub-system and have relatively unobscured access to the mechanical switch. By automatically assigning lane mappings based on the physically coupled optical module, physical presence within the vicinity of the optical sub-system might not be necessary. Additionally, mechanical switches include predetermined communication protocols, and thus are at risk of becoming obsolete once new and/or updated communication protocols are used. An optical interface configured to automatically assign lane mappings based on optical module information can adapt to new and/or updated communication protocols of respective optical modules without the same level of physical intrusion that would be required to update an optical sub-system with a mechanical switch.

Figure 1:
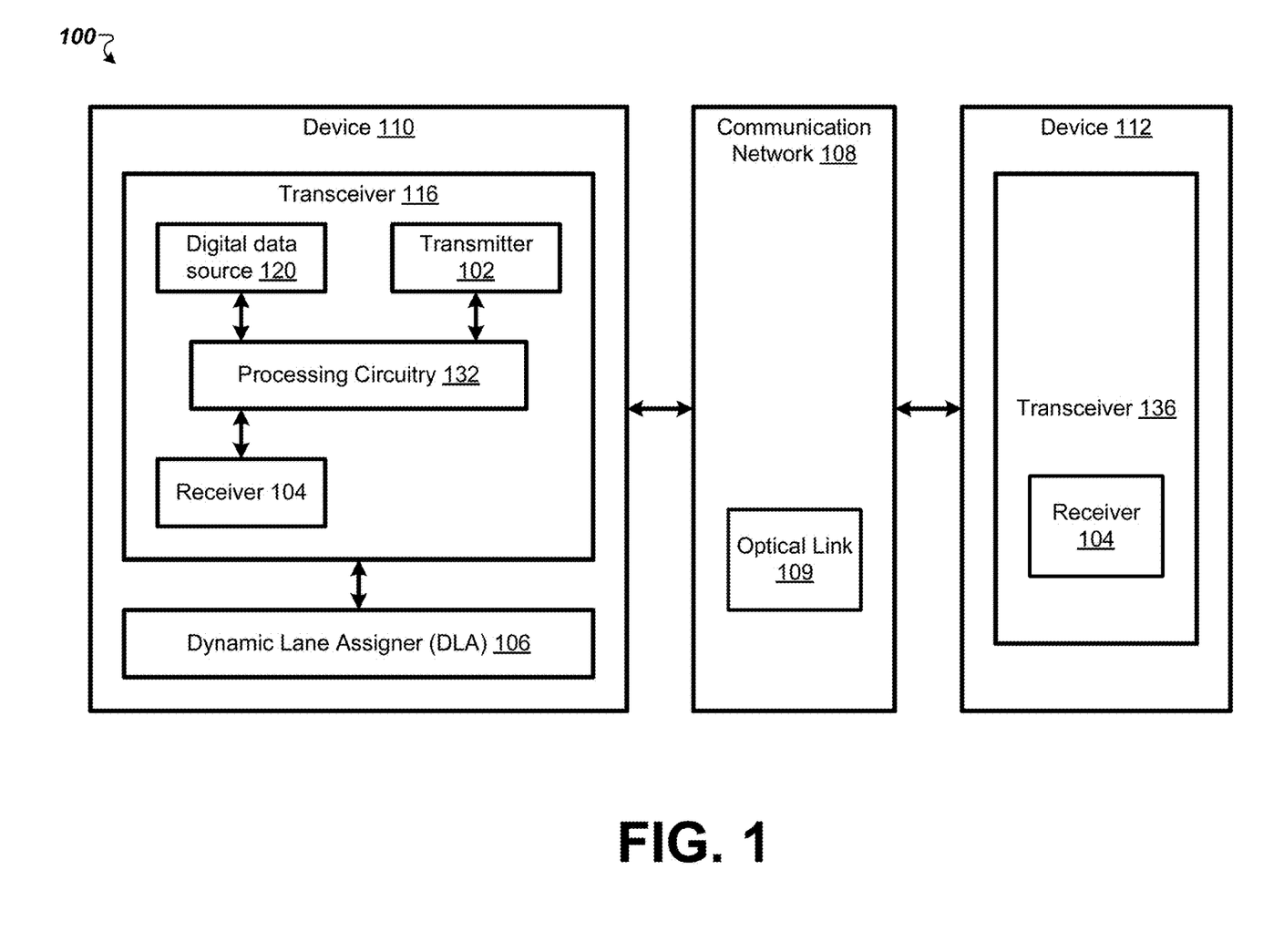
FIG. 1 is a block diagram of an example communication system, in accordance with at least some embodiments.

FIG. 1 illustrates an example of a communication system 100 according to at least one example embodiment. The communication system 100 includes a device 110, a communication network 108 including an optical link 109 (e.g., one or more communication channels), and a device 112. In at least one embodiment, device 110 and device 112 are two end-point devices in a computing system, such as a central processing unit (CPU) or graphics processing unit (GPU). In at least one embodiment, device 110 and device 112 are two servers. In at least one example embodiment, device 110 and device 112 correspond to one or more of a Personal Computer (PC), a laptop, a tablet, a smartphone, a server, a collection of servers, or the like. In some embodiments, the device 110 and device 112 may correspond to any appropriate type of device that communicates with other devices connected to a common type of communication network 108. According to embodiments, the receiver 104 of devices 110 or 112 may correspond to a GPU, a switch (e.g., a high-speed network switch), a network adapter, a CPU, a memory device, an input/output (I/O) device, other peripheral devices, or components on a system-on-chip (SoC), or other devices and components at which a signal is received or measured, etc. As another specific but non-limiting example, the device 110 and device 112 may correspond to servers offering information resources, services, and/or applications to user devices, client devices, or other hosts in the communication system 100. In one example, device 110 and device 112 may correspond to network devices such as switches, network adapters, or data processing units (DPUs).

Examples of the communication network 108 that may be used to connect the device 110 and device 112 include an Internet Protocol (IP) network, an Ethernet network, an InfiniBand (IB) network, a Fibre Channel network, the Internet, a cellular communication network, a wireless communication network, a ground referenced signaling (GRS) link, combinations thereof (e.g., Fibre Channel over Ethernet), variants thereof, and/or the like. In one specific but non-limiting example, the communication network 108 is a network that enables data transmission between the device 110 and device 112 using data signals (e.g., digital, optical, wireless signals).

In the illustrated example, the communication network 108 includes optical link 109. The optical link 109 is a communication link that can transmit optical signals between two points. Optical links 109 can be used to transmit large amounts of data over long distances with minimal signal loss. The optical link 109 can include various optical modules coupled by an optical cable (not illustrated). In some embodiments, an optical lane can be characterized as a communication link between a pair of serializer-deserializer ("SerDes") components of device 110 (not illustrated). Multiple SerDes components can couple to an optical module; thus, a single optical link can have multiple optical lanes. In some embodiments, an optical link 109 includes one or more optical modules that are permanently physically and optically coupled to an optical cable (not illustrated). In some embodiments, an optical link 109 includes one or more optical modules that are removably coupled to an optical cable (not illustrated). Additional details regarding optical modules and optical cables are described herein below with reference to FIGS. 2A-B.

The device 110 can communicate with the device 112 over the optical link 109. That is, in some embodiments, an optical module of the optical link 109 can optically couple to the device 110, and another optical module of the optical link 109 can optically couple to the device 112, thus optically coupling the device 110 to the device 112. To optically couple, the device 110 and/or device 112 can be configured with the same communication protocol as the respective optical module being coupled to the device 110 or device 112.

The device 110 includes a transceiver 116 for sending and receiving signals, for example, data signals. The data signals may be digital or optical signals modulated with data or other suitable signals for carrying data. In some embodiments, the device 110 can be configured to operate in a forced speed mode. The forced speed mode imposes a specific data transfer rate for communications across optical link 109. When operating in forced speed mode, the communication protocol of the device 110 and the respective module coupled to device 110 can be configured to match. That is, the forced speed mode prevents network devices from automatically negotiating a communication speed, and instead sets a "forced speed" (e.g., the specific data transfer rate). For example, in a forced speed mode, a data transfer rate of 100 gigabits per second (Gbps, or "G") can be imposed as a specific data transfer rate for the optical link. An optical sub-system configured for the PAM-4 communication protocol can achieve the forced speed of 100G with two lanes (e.g., 2×50G). The optical module can be configured for the NRZ communication protocol which limits data transfer speeds to 28G per lane, thus requiring four lanes (e.g., 4×25G) to achieve the forced speed of 100G. If the optical sub-system attempts to communicate at a data rate of 50G over two lanes of the NRZ optical module, the optical communication will be unsuccessful because the NRZ optical module supports a maximum data rate of 28G per lane. In some embodiments, the device 110 can be configured to operate split ports (e.g., sub-ports). When operating sub-ports, lanes of the device 110 can be assigned to multiple optical modules of optical link 109, instead of a single optical module of optical link 109 (not illustrated). In some embodiments, lanes can be assigned as respective groups of lanes to maximize system resources of device 110 (e.g., transceiver 116, transmitter 102, processing circuitry 132, etc.). For example, a SerDes component of the device 110 (not illustrated) can operate multiple channels (e.g., of the optical link 109), provided each channel terminates at the same optical module. That is, one SerDes component cannot operate multiple channels that terminate at multiple optical modules.

Device 110 can include a dynamic lane assigner ("DLA") 106. Transceiver 116 can be configured to communicate with DLA 106 within device 110. In some embodiments, DLA 106 can be included in processing circuitry 132. DLA 106 can be configured to automatically change lane assignments of the device 110 to match the communication protocol of an optical link 109, based on information obtained from the optical module (not illustrated). DLA can be a hardware component, a firmware component, a software component, or any combination of hardware, firmware, and software. In some embodiments, DLA 106 is reconfigurable by a user of device 110. In at least one embodiment, DLA 106 can be reconfigured using an application programming interface (API). DLA 106 can be configured to determine the communication protocol of the optical link 109 from a predetermined set of communication protocols. As previously described, in some embodiments, the predetermined set of communication protocols can be updated by a user of device 110 by reconfiguring DLA 106. When an optical module of optical link 109 is inserted into a port of device 110 (not illustrated), DLA 106 can determine the communication protocol of the optical link 109 and automatically assign the lanes of device 110 to match the determined communication protocol. In some embodiments, lanes can be assigned or reassigned between SerDes components (not illustrated) and/or between logical sub-ports of device 110 (not illustrated). Additional details regarding automatically assigning lanes (e.g., using DLA 106) are described herein below with reference to FIGS. 2A-4.

The transceiver 116 may include a digital data source 120, a transmitter 102, a receiver 104, and processing circuitry 132 that controls the transceiver 116. The digital data source 120 may include suitable hardware and/or software for outputting data in a digital format (e.g., in binary code and/or thermometer code). The digital data output by the digital data source 120 may be retrieved from memory (not illustrated) or generated according to input (e.g., user input).

The transmitter 102 includes suitable software and/or hardware for receiving digital data from the digital data source 120 and outputting data signals according to the digital data for transmission over the communication network 108 to a receiver 104 of device 112. Additional details of the structure of the transmitter 124 are discussed in more detail below with reference to the figures.

The receiver 104 of device 110 and device 112 may include suitable hardware and/or software for receiving signals, such as data signals from the communication network 108. For example, the receiver 104 may include components for receiving optical signals.

The processing circuitry 132 may include software, hardware, or a combination thereof. For example, the processing circuitry 132 may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory and processor may be integrated into a common device (e.g., a microprocessor may include integrated memory). Additionally, or alternatively, the processing circuitry 132 may comprise hardware, such as an application-specific integrated circuit (ASIC). Other non-limiting examples of the processing circuitry 132 include an Integrated Circuit (IC) chip, a Central Processing Unit (CPU), a General Processing Unit (GPU), a microprocessor, a Field Programmable Gate Array (FPGA), a collection of logic gates or transistors, resistors, capacitors, inductors, diodes, or the like. Some or all of the processing circuitry 132 may be provided on a Printed Circuit Board (PCB) or collection of PCBs. It should be appreciated that any appropriate type of electrical component or collection of electrical components may be suitable for inclusion in the processing circuitry 132. The processing circuitry 132 may send and/or receive signals to and/or from other elements of the transceiver 116 to control the overall operation of the transceiver 116. In some embodiments, the processing circuitry 132 can facilitate a method to automatically assign SerDes components of device 110 to channels of the communication network 108, as described below with reference to FIGS. 2-6.

The transceiver 116 or selected elements of the transceiver 116 may take the form of a pluggable card or controller for the device 110. For example, the transceiver 116 or selected elements of the transceiver 116 may be implemented on a network interface card (NIC).

The device 112 may include a transceiver 136 for sending and receiving signals, for example, data signals over an optical link 109 of the communication network 108. The same or similar structure of the transceiver 116 may be applied to transceiver 136, and thus, the structure of transceiver 136 is not described separately.

Although not explicitly shown, it should be appreciated that device 110 and device 112 and the transceivers 116 and 136 may include other processing devices, storage devices, and/or communication interfaces generally associated with computing tasks, such as sending and receiving data.

Figure 2A:
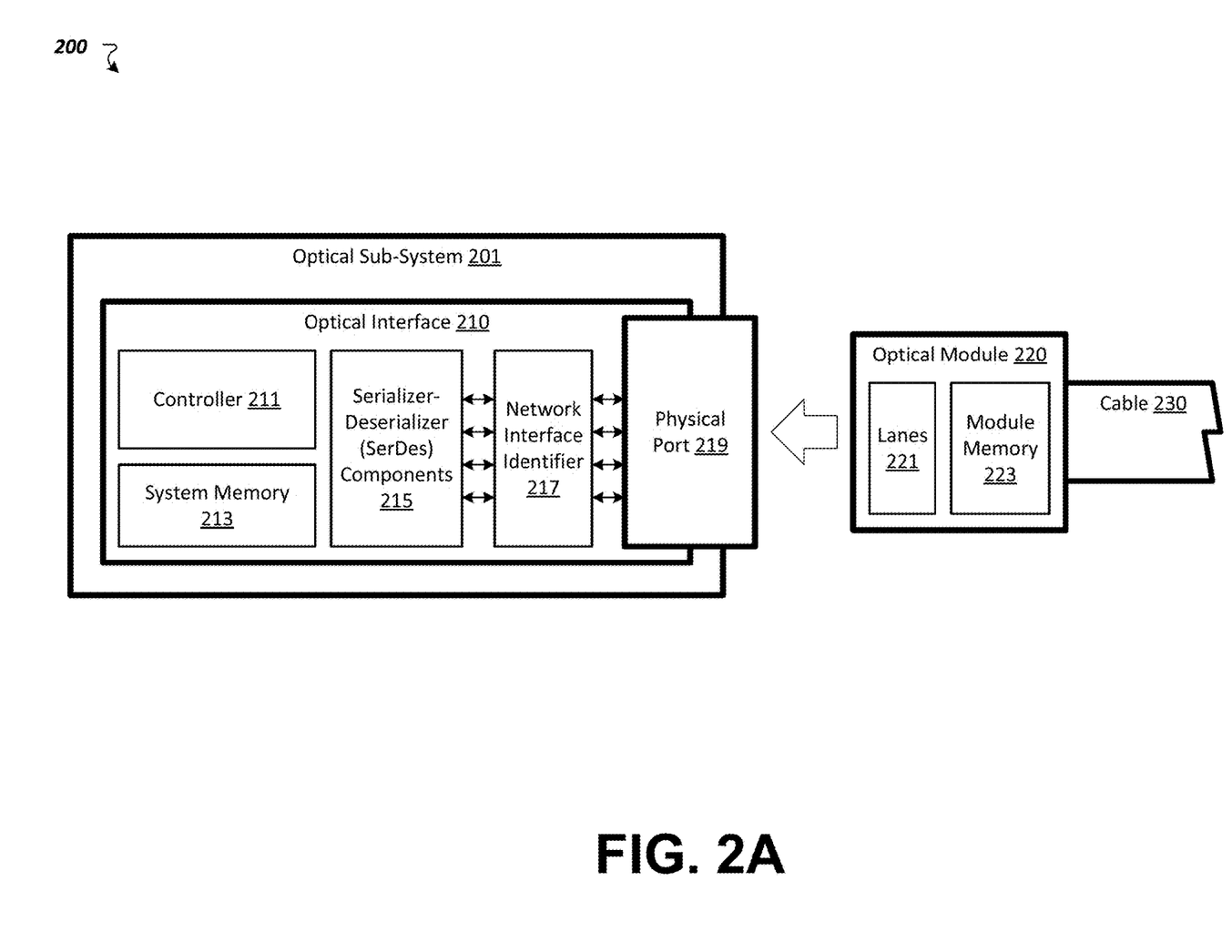
FIG. 2A illustrates an example system for implementing dynamic lane assignments in an optical sub-system, in accordance with at least some embodiments.

FIG. 2A illustrates an example of a system 200 for implementing dynamic lane assignments in optical sub-systems, in accordance with at least some embodiments. As illustrated, system 200 can include optical sub-system 201, optical module 220, and cable 230 coupled to optical module 220. In some embodiments, cable 230 can be removably coupled to optical module 220.

Optical sub-system 201 includes optical interface 210. Optical interface 210 includes controller 211, system memory 213, network interface identifier 217, serializer-deserializer ("SerDes") component 215, and physical port 219. In some embodiments, some or all components of optical interface 210 (e.g., controller 211, system memory 213, network interface identifier 217, SerDes components 215, and/or physical port 219) can be included as individual components of optical sub-system 201 (not illustrated).

Controller 211 can be a processing unit that performs operations stored on system memory 213 for the optical interface 210. In some embodiments, controller 211 can represent a sub-portion or sub-routine of a general processing unit for the optical sub-system 201 (not illustrated). For example, controller 211 can be a part of processing circuitry 132 as described with reference to FIG. 1.

System memory 213 can store instruction sets to be performed by controller 211 as well as one or more data structures (e.g., reference tables) to be used by the optical interface 210 and/or optical sub-system 201 to interface with optical module 220. In at least one embodiment, system memory 213 can include a SerDes lane mapping table. The SerDes lane mapping table can indicate which SerDes component 215 of the optical interface 210 maps to which lane 221 of the optical module 220 through physical port 219.

Network interface identifier 217 can identify the optical sub-system 201 to other devices of a network. For example, the network interface identifier can be a media access control (MAC) hardware identifier component that can be used to distinguish the optical sub-system 201 from other similar optical sub-systems in a network (e.g., communication network 108 as described with reference to FIG. 1).

Physical port 219 can be the portion of optical interface 210 (and thus, the portion of optical sub-system 201) configured to couple to an optical module 220. Physical port 219 can include mechanisms to physically secure the optical module 220 to the optical interface 210, as well as optical components to optically couple the optical interface 210 to the optical module 220. In some embodiments, physical port 219 can be reconfigured with optical components to couple to multiple variations of optical module 220. The optical port can be reconfigured based on the capabilities of the optical sub-system, the capabilities of the optical module, and the requirements for communications across the optical link.

In the illustrated example, physical port 219 is coupled to network interface identifier 217 with four arrows, indicative of multiple distinct optical couplings (e.g., multiple channels/lanes of the optical link). Network interface identifier 217 is illustratively coupled to a SerDes component 215 by an equal quantity of arrows. Notably, in the illustrated example, network interface identifier 217 does not perform a transformative operation on the incoming channels (e.g., the quantity of output channels is the same as the quantity of input channels). Optical interface 210 can include one or more SerDes components 215. In some embodiments, one SerDes component 215 can accept multiple optical channels (e.g., a respective lane of lanes 221 in optical module 220). In some embodiments, each SerDes component accepts a single optical channel. In some embodiments, each SerDes component 215 can correspond to a sub-port of the physical port 219.

Optical module 220, as illustrated, includes lanes 221 and module memory 223. SerDes components 215 of optical interface 210 are configured to optically couple to each lane of lanes 221 of the optical module 220 (e.g., via optical components of physical port 219). In many embodiments, module memory 223 can include optical module information, such as cable type, optical communication type (e.g., PAM, NRZ, etc.), manufacturing company, etc. Various optical modules can have various optical communication types (e.g., PAM, NRZ, etc.) while maintaining the same physical port. In many embodiments, module memory 223 can be an electrically erasable programmable read-only memory (EEPROM) that has been programmed with optical module information for optical module 220. Optical interface 210 can be configured to read information stored on module memory 223.

Cable 230, as illustrated, is optically and physically coupled to optical module 220. In some embodiments, cable 230 can be permanently coupled (optically and physically) to optical module 220. In some embodiments, cable 230 can be removably coupled (optically and physically) to optical module 220. In some embodiments, optical module 220 and cable 230 can be referred to as an optical link, such as the optical link described above.

Figure 2B:
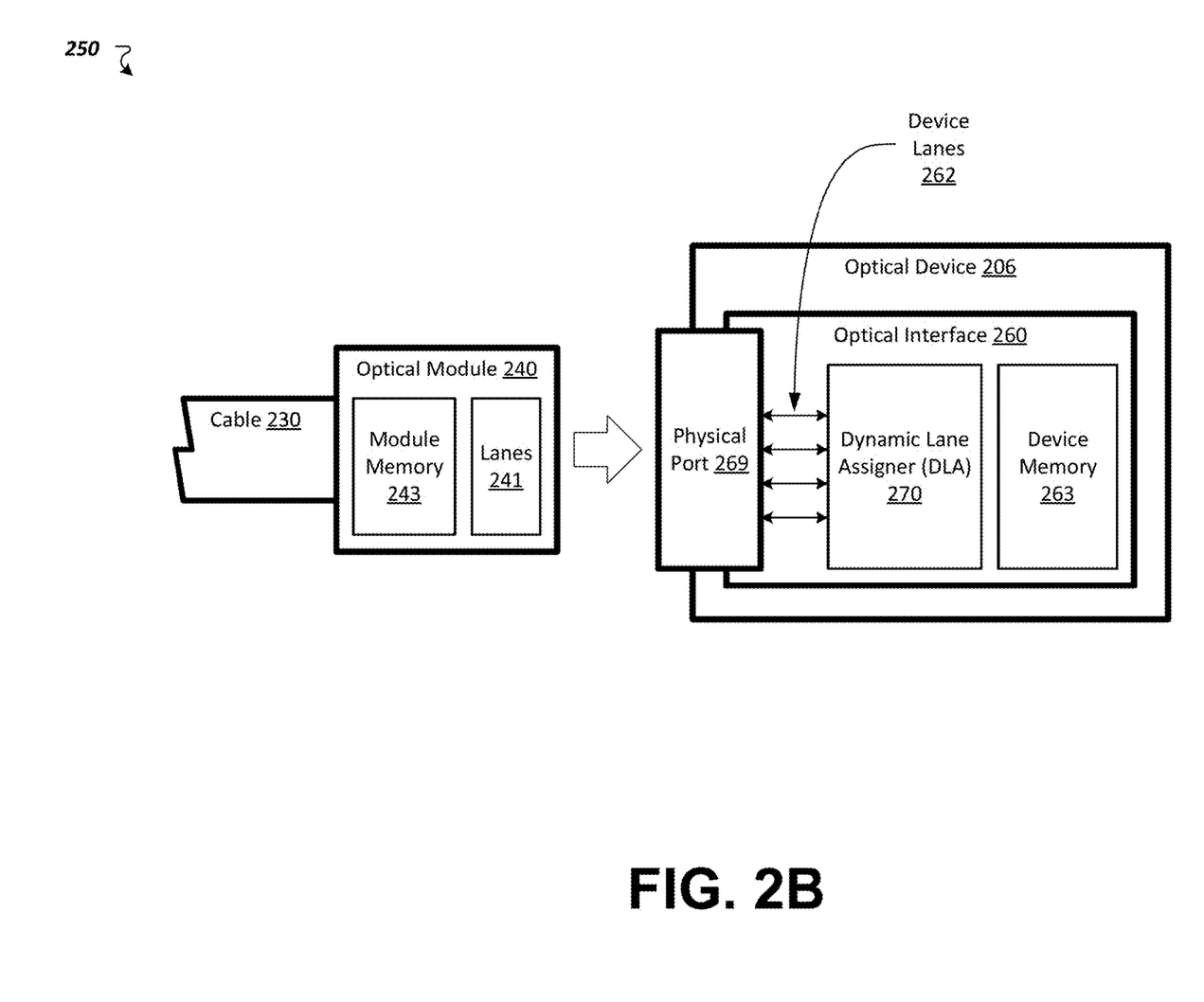
FIG. 2B illustrates an example system for implementing a dynamic lane assigner in an optical communication environment, in accordance with at least some embodiments.

FIG. 2B illustrates an example of a system 250 for implementing a dynamic lane assigner (e.g., DLA 270) in an optical communication environment, in accordance with at least some embodiments. As illustrated, system 250 can include optical device 206, optical module 240, and cable 230 coupled to optical module 240. In some embodiments, cable 230 can be removably coupled to optical module 240. Cable 230 can be the cable 230 as described with reference to FIG. 2A.

Optical device 206 includes optical interface 260. Optical interface 260 includes device memory 263, physical port 269, and DLA 270. In some embodiments, some or all components of optical interface 260 (e.g., device memory 263, physical port 269, and/or DLA 270) can be included as individual components of the optical device 206.

Device memory 263 can store instruction sets to be performed by DLA 270 as well as one or more data structures (e.g., reference tables) to be used by the optical interface 260 and/or optical device 206 to interface with optical module 240. In at least one embodiment, device memory 263 can include a lane mapping table. The lane mapping table can indicate which device lanes 262 of the optical interface 210 maps to which lanes 241 of the optical module 240 through physical port 269.

Physical port 269 can be the portion of optical interface 210 (and thus, the portion of optical sub-system 201) configured to couple to an optical module 240. Physical port 269 can include mechanisms to physically secure the optical module 240 to the optical interface 260, as well as optical components to optically couple the optical interface 260 to the optical module 240. In some embodiments, physical port 269 can be configured with optical components to couple to multiple variations of optical module 240.

DLA 270 can be a processing unit that performs operations stored on device memory 263 for the optical interface 260. In some embodiments, DLA 270 can represent a sub-portion or sub-routine of a general processing unit for the optical device 206 (not illustrated). For example, DLA 270 can be a part of processing circuitry 132 as described with reference to FIG. 1. In some embodiments, DLA 270 can include a controller, network interface identifier, and one or more SerDes components (e.g., such as controller 211, SerDes component 215 and/or network interface identifier 217 as described with reference to FIG. 2A).

In the illustrated example, physical port 269 is coupled to DLA 270 with four arrows, indicative of multiple distinct lanes (e.g., device lanes 262). DLA 270 can identify the optical device 206 to the optical module 240, and map each device lane 262 to a SerDes component included in DLA 270. In some embodiments, one SerDes component can couple to two or more device lanes 262. In some embodiments, each device lane 262 couples to a respective SerDes component of DLA 270. In some embodiments, the physical port 269 can include one or more logical sub-ports. Each logical sub-port can correspond to a SerDes component. Optical module 240 can be coupled to multiple SerDes components of DLA 270 via multiple device lanes 262. However, a SerDes component of DLA 270 cannot couple to multiple optical modules 240.

Optical module 240, as illustrated, includes lanes 241 and module memory 243. Respective SerDes components of DLA 270 are configured to optically couple to each lane of lanes 241 of the optical module 240 (e.g., via optical components of physical port 269). In many embodiments, module memory 243 can include optical module information, such as cable type, optical communication type (e.g., PAM, NRZ, etc.), manufacturing company, etc. Various optical modules can have various optical communication types (e.g., PAM, NRZ, etc.) while maintaining the same physical port. In many embodiments, module memory 243 can be an electrically erasable programmable read-only memory (EEPROM) that has been programmed with optical module information for optical module 240. Optical interface 260 can be configured for reading information stored on module memory 243.

Cable 230, as illustrated, is optically and physically coupled to optical module 240. In the illustrated example of FIG. 2B, cable 230 can represent the other end of cable 230, as illustrated with reference to FIG. 2A (e.g., FIG. 2A and FIG. 2B represent different ends of the cable 230, that is, optical device 206 of FIG. 2B can be optically coupled to optical sub-system 201 of FIG. 2A). Cable 230 can optically couple to one or more lanes 241 of optical module 240. In some embodiments, the quantity of lanes 241 coupled to cable 230 is different from the quantity of lanes 221 coupled to another end of cable 230. That is, cable 230 can be a breakout cable that physically separates the data transfer rate of the optical sub-system 201 or the optical device 206 into multiple cables of reduced data transfer rates. Additional details regarding breakout cables can be found below with reference to FIG. 4.

In some embodiments, cable 230 can be permanently coupled (optically and physically) to optical module 220. In some embodiments, cable 230 can be removably coupled (optically and physically) to optical module 220. In some embodiments, optical module 220 and cable 230 can be referred to as an optical link, such as the optical link described above.

Figure 3A:
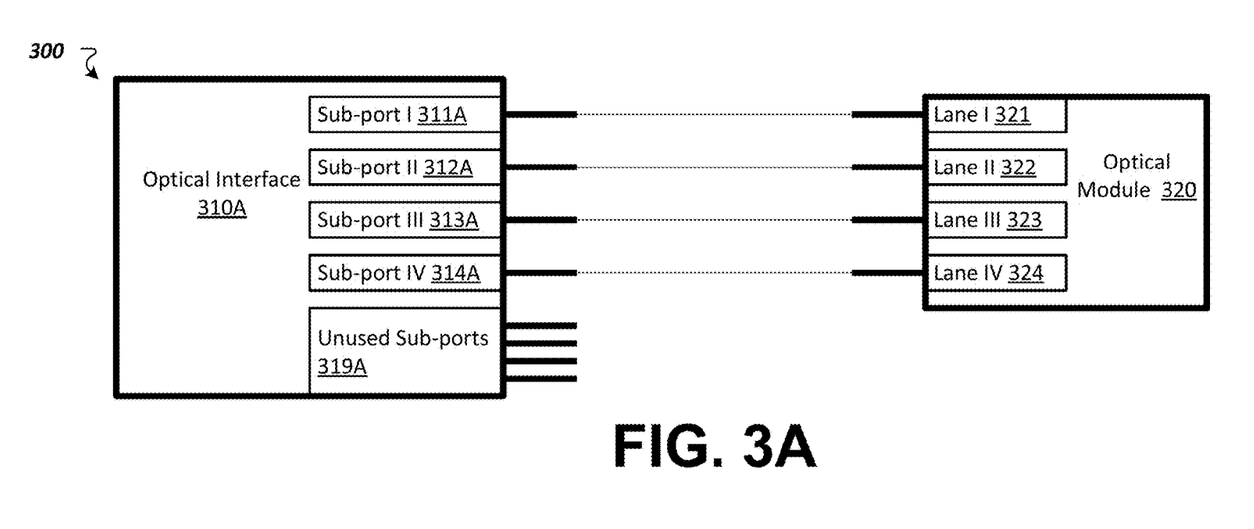
FIG. 3A illustrates an example configuration for coupling an optical interface to an optical module, in accordance with at least some embodiments.

FIG. 3A illustrates an example of a configuration 300 for coupling an optical interface to an optical module, in accordance with at least some embodiments. Configuration 300 includes an optical interface 310A and an optical module 320A. For clarity, the optical sub-system includes optical interface 310A. Additional portions of optical interface 310A (e.g., a controller, memory, SerDes component, network identifier, and/or physical port, such as is described with respect to FIGS. 2A-B) are also not illustrated. These components are not illustrated merely for clarity, and it is to be understood that these components and other components can be included in and/or coupled to optical interface 310A. In the illustrated example, sub-port I 311A includes one channel (illustrated by the extruded line) that couples to the channel of lane I 321 of optical module 320. Similarly, channels of sub-port II 312A, sub-port III 313A, and sub-port IV 314A respectively couple to channels of lane II 322, lane III 323, and lane IV 324. As found in the illustrated example, the optical interface 310A can couple to the optical module 320 because the number of channels per sub-port of the optical interface 310A matches the lane configuration of optical module 320 (e.g., each sub-port of optical interface 310A has one channel). In some embodiments, the lane configuration can be based on a configurable speed for the optical link. For example, if the configurable speed for the optical link is set to 100G and the optical module 320 supports four lanes at 25G per lane, the optical interface 310 can be configured as an optical interface 310A, as found in the illustrated example. In such an example, because the optical module 320 supports 25G per lane, the optical interface 310 could not be configured to communicate with only two lanes at 50G per lane.

In the illustrated example, unused sub-ports 319A can be unused with respect to the illustrated optical module 320. In some embodiments, it can be desirable to couple additional optical modules (e.g., such as optical modules 320, not illustrated) to optical interface 310A. This can be accomplished by mapping the unused sub-ports 319A to lanes of a second optical module. The lane mapping to the second optical module would resemble the illustrated lane mapping between optical interface 310A and optical module 320, albeit using the last four channels of optical interface 310A (currently illustrated as assigned to unused sub-ports 319A). The number or quantity of lanes (e.g., channels) per sub-port can be based on the capabilities of the SerDes component coupled to the sub-port, as described above with reference to FIG. 2. For example, a SerDes component can be capable of 50G speeds for a single channel of a sub-port, or 25G speeds for two channels of a sub-port, and so on.

Figure 3B:
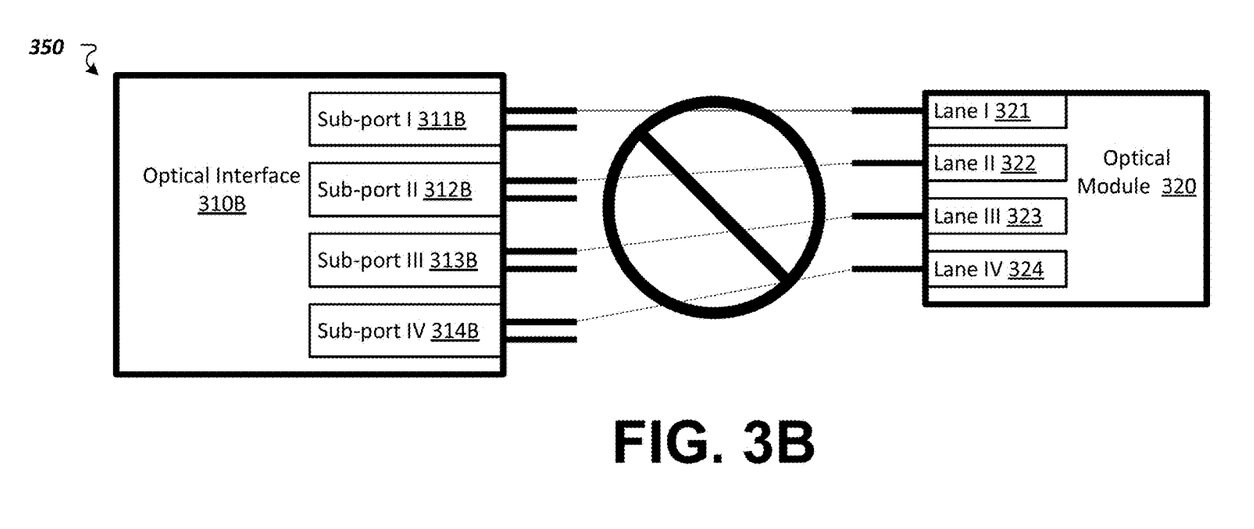
FIG. 3B illustrates an example configuration of an improperly coupled optical interface and an optical module.

FIG. 3B illustrates an example of a configuration 350 of an improperly coupled optical interface and optical module. Configuration 350 includes an optical interface 310B and an optical module 320. For clarity, the optical sub-system that includes each optical interface 310B is not illustrated. Additional portions of optical interfaces 310B (e.g., a controller, memory, SerDes component, network identifier, and/or physical port, such as is described with respect to FIGS. 2A-B) are also not illustrated. These components are not illustrated merely for clarity, and it is to be understood that these components and other components can be included in and/or coupled to optical interface 310B. In the illustrated example, sub-port I 311B includes two channels (illustrated by the extruded parallel lines) with one channel of sub-port I 311B coupled to the channel of lane I 321. Similarly, one channel of each of sub-port II 312B, sub-port III 313B, and sub-port IV 314B are respectively coupled to channels of lane II 322, lane III 323, and lane IV 324. As found in the illustrated example, the type of coupling is improper because the number of channels per sub-port of the optical interface 310B does not match the lane configuration of optical module 320 (e.g., each sub-port of optical interface 310B has two channels). That is, optical interface 310B has detected four lanes of the optical module 320 (e.g., lane I 321, lane II 322, lane III 323, and lane IV 324) and is configured to connect the first four lanes of the optical interface (e.g., the first four lanes between sub-port I 311B and sub-port II 312B) to the four lanes of the optical module 320. In some embodiments, configuration 350 (e.g., illustratively, optical interface 310B) is a physical configuration, in that sub-port III 313B and sub-port IV 314B are physically disconnected from components of the optical interface (e.g., such as controller 211, system memory 213, SerDes components 215, and network interface identifier 217 as described with reference to FIG. 2A). In such embodiments, because sub-port III 313B and sub-port IV 314B are physically disconnected from components of optical interface 310B, optical interface 310B is unable to communicate with optical module 320 as shown in the illustrated example of configuration 350 in FIG. 3B. In some embodiments, it can be desirable to couple additional optical modules (e.g., such as optical modules 320, not illustrated) to optical interface 310B. However, in configuration 350, optical interface 310B is incapable of coupling to additional optical modules. Thus, while optical interface 310B and optical module 320 can technically couple in the manner illustrated in configuration 350, such coupling is inefficient, and might prevent full use of the resources of optical interface 310B.

Figure 4:
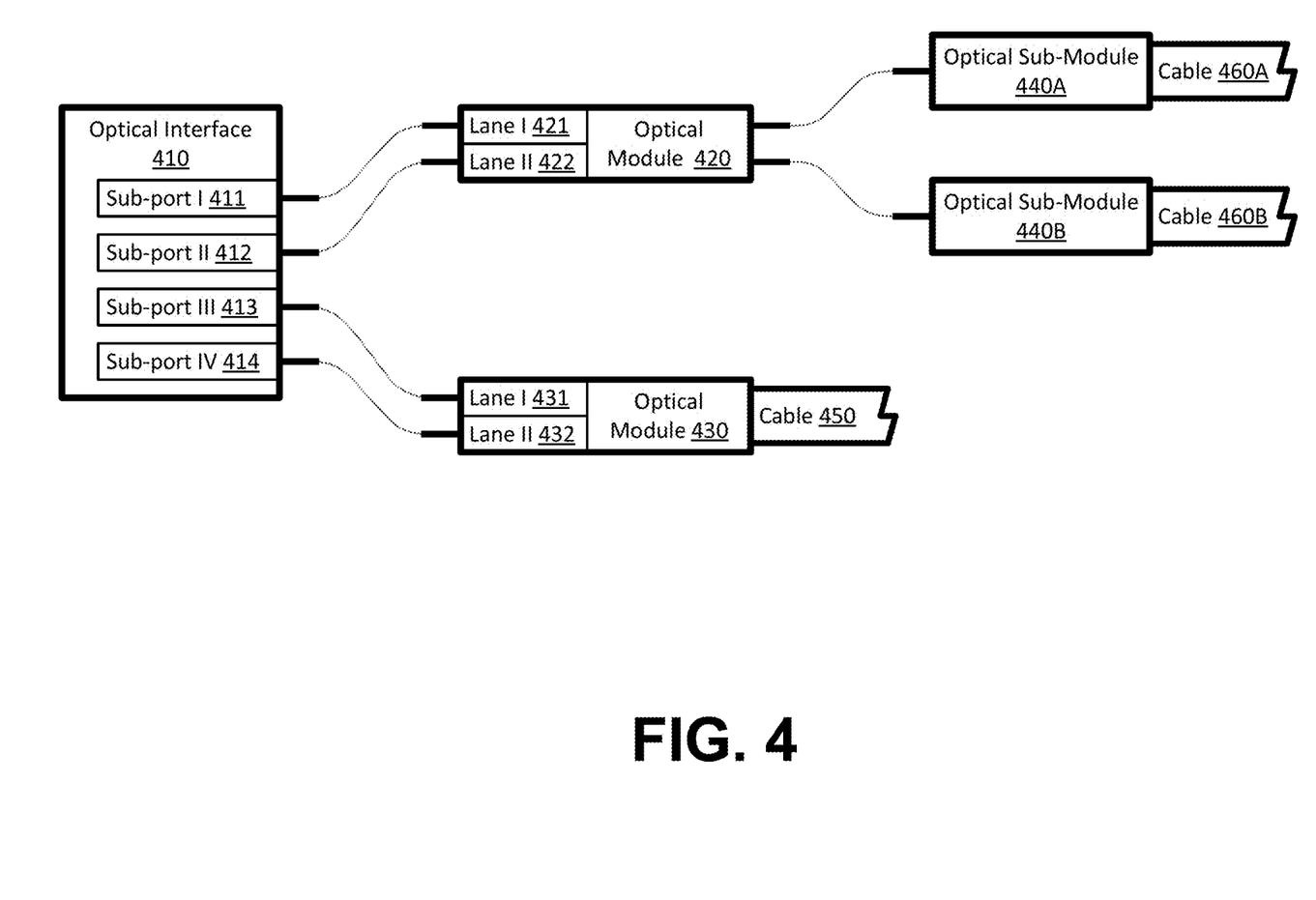
FIG. 4 illustrates an example configuration for coupling an optical interface to an optical module, in accordance with at least some embodiments.

FIG. 4 illustrates an example of a configuration 400 for coupling an optical interface to an optical module, in accordance with at least some embodiments. Configuration 400 includes an optical interface 410, optical module 420, optical module 430, and optical sub-modules 440A and 440B. For clarity, the optical sub-system that includes optical interface 410 is not illustrated. Additional portions of optical interface 410 (e.g., a controller, memory, SerDes component, network identifier, and/or physical port, such as is described with respect to FIGS. 2A-B) are also not illustrated. These components are not illustrated merely for clarity, and it is to be understood that these components and other components can be included in and/or coupled to optical interface 410.

In the illustrated example of configuration 400, optical interface 410 operates multiple sub-ports (e.g., sub-port I 411, sub-port II 412, sub-port III 413, and sub-port IV 414) as split ports. As described above, a split port can be a logical division of the data transfer rate capabilities of a physical port of an optical sub-system. In the illustrated example, sub-port I 411 includes one channel (illustrated by the extruded line) that couples to lane I 421 of optical module 420. Sub-port II 412 is coupled to lane II 422 of optical module 420. Similarly, sub-port III 413 and sub-port IV 414 are respectively coupled to lane I 431 and lane II 432 of optical module 430. Cable 460A can be coupled at another end of the cable to another optical sub-module (not illustrated) configured to physically and optically couple to an optical device (not illustrated), as illustrated in system 250 as described with reference to FIG. 2B.

Optical module 430 and optical sub-modules 440 can be optical modules as previously described (e.g., optical module 220, 240, or 320, respectively, as described with reference to FIGS. 2A-3B). Cables 450, 460A, and 460B can be cables as previously described (e.g., cable 230 described with reference to FIGS. 2A-B). Optical module 420 can be an optical module as previously described. In some embodiments, optical module 420 and optical sub-module 440A and optical sub-module 440B can be permanently coupled together (e.g., as a breakout cable). In the illustrated example, each optical sub-module 440 is optically coupled to a respective cable 460 (e.g., cables 460A and 460B). Thus, in the illustrated example, sub-port I 411 corresponds to optical sub-module 440A, and sub-port II 412 corresponds to optical sub-module 440B.

Figure 5:
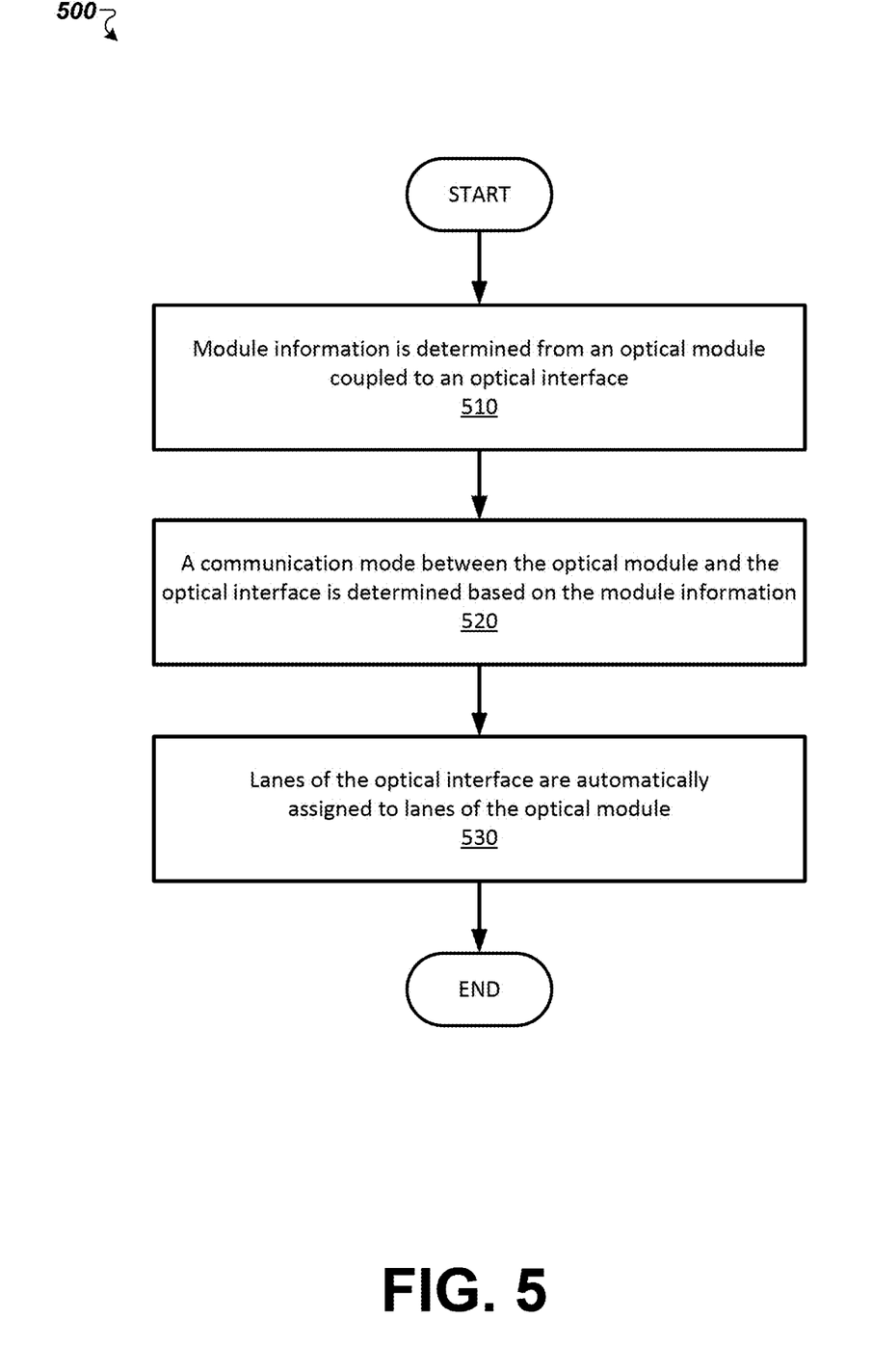
FIG. 5 illustrates a flow diagram of a method to implement a dynamic lane assigner, in accordance with at least some embodiments.

FIG. 5 illustrates a flow diagram of a method 500 to implement a dynamic lane assigner ("DLA"), in accordance with at least some embodiments. Method 500 can be performed by processing logic comprising hardware, software, firmware, or any combination thereof. In at least one embodiment, method 500 is performed by a controller of an optical interface, such as controller 211 of optical interface 210. For example, DLA can be used by a transceiver, such as transceiver 116 or transceiver 136 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, module information is determined from an optical module coupled to an optical interface. Module information can be stored in a memory of the optical module. Module information can include a per-channel data transfer rate, a number or quantity of lanes supported by the optical module (e.g., quantity of communication channels), manufacturer information, a communication type, etc. A component of the optical interface (e.g., DLA) can read the module information from the memory of the optical module.

At operation 520, a communication mode between the optical module and the optical interface is determined based on the module information. A "communication mode" can refer to a standard communication protocol such as various PAM protocols or NRZ communications. In some embodiments, a communication mode can refer to a quantity of supported communication channels and a per-channel data transfer rate. In some embodiments, a communication mode can refer to an overall data transfer rate supported by the optical module. For example, an optical module might support an overall data transfer rate of 100G for one to ten communication channels. In such an example, the communication mode would support one 100G communication channel, two 50G communication channels, four 25G communication channels, etc. In some embodiments, the module information can indicate a number or quantity of connected channels. For example, the optical module might be capable of supporting ten communication channels of 10G each, however, the optical module might only be optically coupled to four communication channels (e.g., the cable coupled to the optical module might optically couple to four communication channels). In some embodiments, module information can indicate whether portions of the optical module are activated or deactivated. Returning to the previous example of the optical module capable of supporting ten communication channels, if an optical cable is only optically coupled to four communication channels, the remaining six communication channels can be deactivated communication channels.

At operation 530, lanes of the optical interface are automatically assigned to lanes of the optical module. Once the communication mode has been determined, the number of lanes required for the optical module is known. The DLA can configure the sub-ports of the optical interface (as described above with reference to FIGS. 2-4) to match the lane configuration of the optical module. In some embodiments, the quantity of channels per sub-port of the optical interface can be reconfigured. For example, if the optical interface is configured with two channels per sub-port and the lane configuration of the optical module requires one channel per sub-port, the DLA can reconfigure the sub-ports of the optical interface to include one channel. In some embodiments, channels of the optical interface can be numbered sequentially (e.g., starting at channel 0 or channel 1). In such embodiments, the DLA can assign channels of the optical interface sequentially to lanes of the optical module. In this way, the first available channel (e.g., the lowest numbered channel that is not already assigned) can be used for new assignments. In some embodiments, sequential channel selection may not be possible due to channel grouping with respect to a SerDes component. That is, the channels of a SerDes component cannot be assigned to more than one optical module. Thus, if each SerDes component is coupled to four channels and a lane configuration of the optical module requires two channels, the remaining channels coupled to the SerDes component will go unused.

In some embodiments, the optical sub-system can be operated in a forced speed mode. As described above, the forced speed mode can impose a specific data transfer rate on the optical link. When the forced speed mode is enabled, the optical sub-system can determine that the forced speed mode is enabled and proceed to generate a lane map between the lanes of the optical interface and the lanes of the optical module to satisfy the forced speed requirement. For example, if the optical sub-system imposed a forced speed mode of 40G and module information indicates a maximum data transfer rate of 10G per channel of the optical module, the optical sub-system can dynamically assign four lanes of the optical interface to four respective lanes of the optical module, thus satisfying the 40G forced speed requirement.

In some embodiments, the optical sub-system can be operated with split ports. As described above, split ports can refer to logical subdivisions of the data transfer capacity of a physical port of an optical sub-system. Split ports can be reconfigured based on the module information obtained from the optical module. If an optical module has a lane configuration that enables multiple channels per split port, the sub-ports (e.g., split ports) of the optical sub-system can be configured with multiple channels. If the optical module has a lane configuration that does not enable multiple channels per split port, the sub-ports of the optical sub-system can be configured with a single channel. An illustrative example of split ports is described above with reference to FIG. 4.

Figure 6:
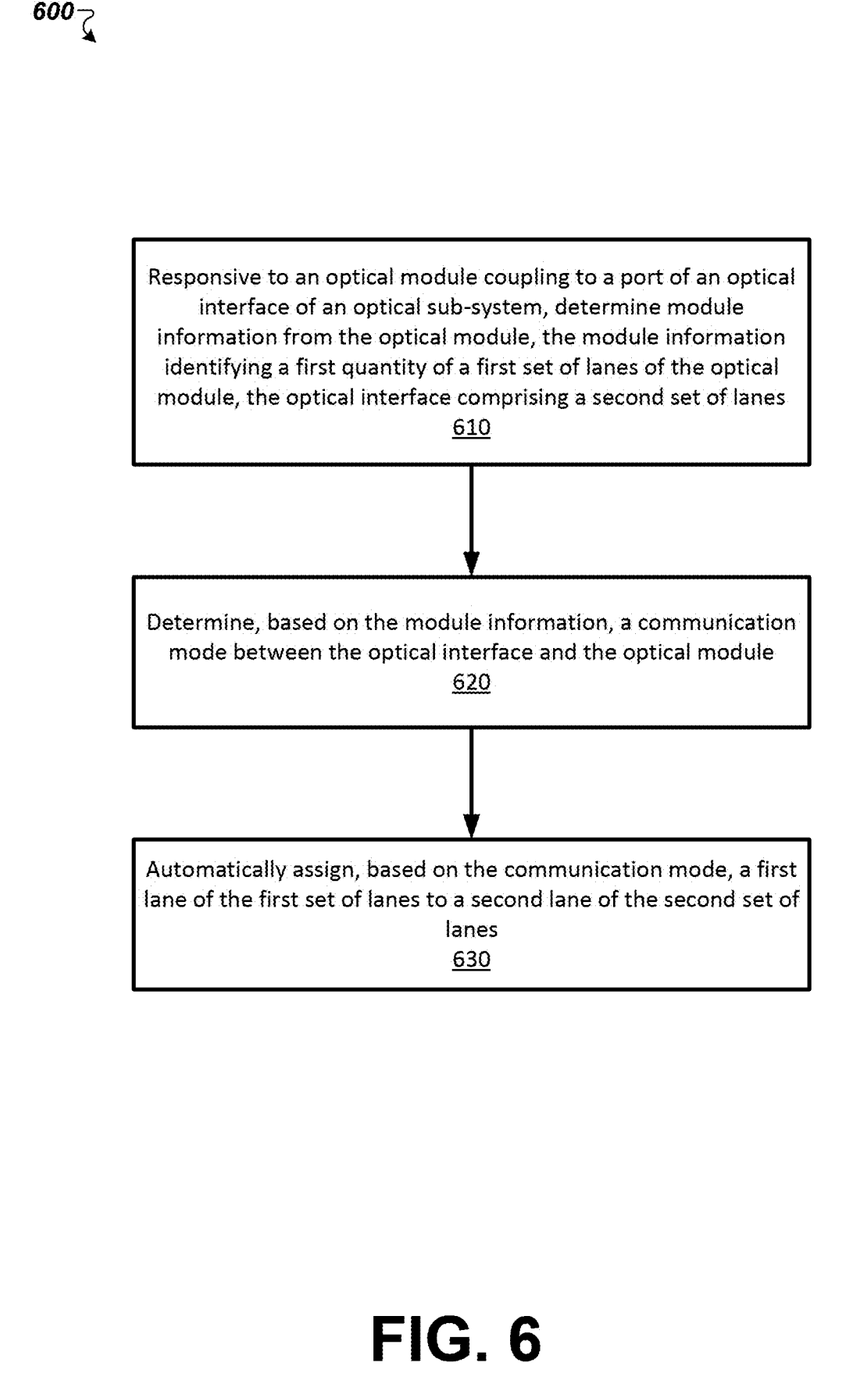
FIG. 6 illustrates a flow diagram of a method to implement a dynamic lane assigner, in accordance with at least some embodiments.

FIG. 6 illustrates a flow diagram of a method 600 to implement a dynamic lane assigner ("DLA"), in accordance with at least some embodiments. Method 600 can be performed by processing logic comprising hardware, software, firmware, or any combination thereof. In at least one embodiment, method 600 is performed by a controller of an optical interface, such as controller 211 of optical interface 210. For example, DLA can be used by a transceiver, such as transceiver 116 or transceiver 136 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 610, responsive to an optical module coupling to a port of an optical interface of an optical sub-system, processing logic (e.g., processing logic used by DLA) determines module information from the optical module, the module information identifying a first quantity of a first set of lanes of the optical module, the optical interface including a second set of lanes. In some embodiments, the module information can be stored in a memory of the optical module. The optical interface (e.g., using DLA) can be configured to read module information from the memory of the optical module.

At operation 620, processing logic determines, based on the module information, a communication mode between the optical interface and the optical module. In some embodiments, responsive to determining that the second quantity of lanes is equal to or greater than the first quantity of lanes, processing logic can select a lane mapping scheme based on the first quantity of lanes. The lane mapping scheme can be selected from a set of pre-defined lane mapping schemes. The lane mapping scheme can indicate (e.g., be an indicator for, or correspond to) the communication mode. In some embodiments, the lane mapping scheme is configurable. The lane mapping scheme can be configured by a user of the optical interface. In at least one embodiment, the lane mapping scheme can be configured using an application programming interface (API). In some embodiments, responsive to determining that the second quantity of lanes is less than the first quantity of lanes, processing logic can select a lane mapping scheme based on the second quantity of lanes to indicate the communication mode.

In some embodiments, processing logic can determine the communication mode using additional information. Processing logic can identify a data rate for lanes of the optical interface and determine a data rate for lanes of the optical module. Responsive to determining that the data rate for lanes of the optical interface is equal to or greater than the data rate for lanes of the optical module, processing logic can select a lane mapping scheme based on the slower data rate (e.g., the data rate for lanes of the optical module). Responsive to determining that the data rate for lanes of the optical interface is less than the data rate for lanes of the optical module, processing logic can select a lane mapping scheme based on the slower data rate (e.g., the data rate for lanes of the optical interface). In some embodiments, processing logic can determine the data rate for lanes of the optical module by sending test signals of progressively larger sizes and/or requiring shorter response times across the optical link through the optical module. In such embodiments, the data rate for a tested lane of the optical module can be based on the largest signal sent and/or the shortest response time for a given test signal. In some embodiments, the communication mode can be a non-return-to-zero (NRZ) communication mode. In some embodiments, the communication mode can be a pulse-amplitude modulation (PAM) communication mode (e.g., PAM-4, PAM-16, etc.). In some embodiments, the communication mode can be a quadrature-amplitude modulation (QAM) communication mode (e.g., QAM-16, QAM-64, etc.) It will be appreciated that the above are not an exhaustive list of communication protocols, but are merely an exemplary listing of possible communication protocols. Other optical communication protocols thus can also be considered as a communication mode.

At operation 630, processing logic automatically assigns, based on the communication mode, a first lane of the first set of lanes to a second lane of the second set of lanes. In some embodiments, a subset of lanes of the second set of lanes are automatically assigned to the first set of lanes, the subset of lanes including the first lane. That is, a subset of lanes of an optical interface can be automatically assigned to all lanes of an optical module.

In some embodiments, a second optical module can be simultaneously coupled to the optical interface. The module information of the second optical module can determine the communication mode for the second optical module and subsequent lane assignments. Notably, when the module information of the second optical module differs from the module information of the original optical module, the communication mode for the second optical module will also differ from the communication mode of the original optical module. That is, the optical interface is capable of interfacing with multiple communication modes simultaneously. For example, an NRZ optical module can be coupled to the optical interface and can enable communications across an NRZ optical link. Simultaneously, a PAM-4 optical module can be coupled to the optical interface and can enable communications across a PAM-4 optical link.

After the optical module has been decoupled from the optical interface, another optical module can be coupled to the optical interface. The communication mode and lane assignment maps are not permanently linked to the optical port of the optical interface. That is, the optical interface is capable of reconfiguring the communication mode and lane assignment maps for an optical port after an optical module has been decoupled. For example, an NRZ optical module can be coupled to the optical interface and can enable communications across an NRZ optical link. After the NRZ optical module is decoupled from the optical interface, a PAM-4 optical module can be coupled to the optical interface and can enable communications across a PAM-4 optical link.

Figure 7:
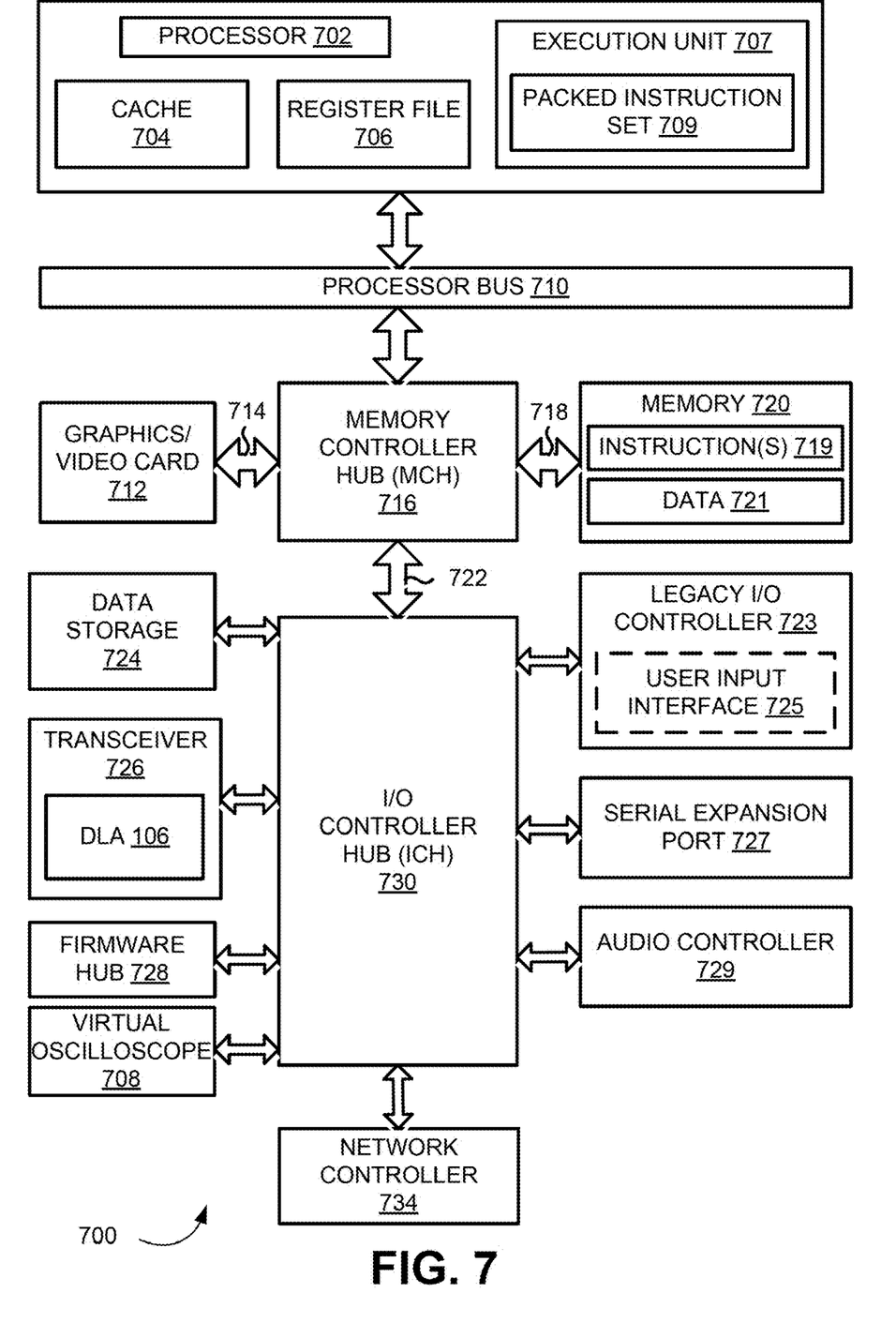
FIG. 7 illustrates an example computer system including a transceiver with a chip-to-chip interconnect, in accordance with at least some embodiments.

FIG. 7 illustrates an example of a computer system 700 including a transceiver including a chip-to-chip interconnect, in accordance with at least one embodiment. In at least one embodiment, computer system 700 may be a system with interconnected devices and components, an SOC, or some combination. In at least one embodiment, computer system 700 is formed with a processor 702 that may include execution units to execute an instruction. In at least one embodiment, computer system 700 may include, without limitation, a component, such as processor 702 to employ execution units including logic to perform algorithms for processing data. In at least one embodiment, computer system 700 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 700 may execute a version of WINDOWS' operating system available from Microsoft Corporation of Redmond, Wash., although other operating systems (UNIX and Linux for example), embedded software, and/or graphical user interfaces, may also be used.

In at least one embodiment, computer system 700 may be used in other devices, such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions. In an embodiment, computer system 700 may be used in devices such as graphics processing units (GPUs), network adapters, central processing units and network devices such as switches (e.g., a high-speed direct GPU-to-GPU interconnect such as the NVIDIA GH100 NVLINK or the NVIDIA Quantum 2 64 Ports InfiniBand NDR Switch).

In at least one embodiment, computer system 700 may include, without limitation, processor 702 that may include, without limitation, one or more execution units 707 that may be configured to execute a Compute Unified Device Architecture ("CUDA") (CUDA® is developed by NVIDIA Corporation of Santa Clara, CA) program. In at least one embodiment, a CUDA program is at least a portion of a software application written in a CUDA programming language. In at least one embodiment, computer system 700 is a single processor desktop or server system. In at least one embodiment, computer system 700 may be a multiprocessor system. In at least one embodiment, processor 702 may include, without limitation, a CISC microprocessor, a RISC microprocessor, a VLIW microprocessor, a processor implementing a combination of instruction sets, or any other processor device, such as a digital signal processor, for example. In at least one embodiment, processor 702 may be coupled to a processor bus 710 that may transmit data signals between processor 702 and other components in computer system 700.

In at least one embodiment, processor 702 may include, without limitation, a cache 704. Cache 704 can be, for example, a Level-1 ("L1") internal cache memory. In some embodiments, processor 702 can be a general-purpose processor. In at least one embodiment, processor 702 may have a single internal cache or multiple levels of internal cache. In at least one embodiment, cache memory may reside external to processor 702. In at least one embodiment, processor 702 may also include a combination of both internal and external caches. In at least one embodiment, register file 706 may store different types of data in various registers including, without limitation, integer registers, floating point registers, status registers, and instruction pointer register.

In at least one embodiment, execution unit 707, including, without limitation, logic to perform integer and floating point operations, also resides in processor 702. Processor 702 may also include a microcode ("ucode") read-only memory ("ROM") that stores microcode for certain macro instructions. In at least one embodiment, execution unit 707 may include logic to handle packed instruction set 709. In at least one embodiment, by including packed instruction set 709 in an instruction set of processor 702, along with associated circuitry to execute instructions, operations used by many multimedia applications may be performed using packed data in processor 702. In at least one embodiment, many multimedia applications may be accelerated and executed more efficiently by using full width of a processor's data bus for performing operations on packed data, which may eliminate a need to transfer smaller units of data across a processor's data bus to perform one or more operations one data element at a time.

In at least one embodiment, an execution unit may also be used in microcontrollers, embedded processors, graphics devices, DSPs, and other types of logic circuits. In at least one embodiment, computer system 700 may include, without limitation, memory 720. In at least one embodiment, memory 720 may be implemented as a DRAM device, an SRAM device, flash memory device, or other memory device. Memory 720 may store instruction(s) 719 and/or data 721 represented by data signals that may be executed by processor 702.

In at least one embodiment, a system logic chip may be coupled to processor bus 710 and memory 720. In at least one embodiment, the system logic chip may include, without limitation, memory controller hub ("MCH") 716, and processor 702 may communicate with MCH 716 via processor bus 710. In at least one embodiment, MCH 716 may provide a high bandwidth memory path 718 to memory 720 for instruction and data storage and for storage of graphics commands, data and textures. In at least one embodiment, MCH 716 may direct data signals between processor 702, memory 720, and other components in computer system 700 and to bridge data signals between processor bus 710, memory 720, and system I/O 722. In at least one embodiment, a system logic chip may provide a graphics port for coupling to a graphics controller. In at least one embodiment, MCH 716 may be coupled to memory 720 through high bandwidth memory path 718, and graphics/video card 712 may be coupled to MCH 716 through Accelerated Graphics Port ("AGP") interconnect 714.

In at least one embodiment, computer system 700 may use the system I/O 722 that is a proprietary hub interface bus to couple the MCH 716 to I/O controller hub ("ICH") 730. In at least one embodiment, ICH 730 may provide direct connections to some I/O devices via a local I/O bus. In at least one embodiment, a local I/O bus may include, without limitation, a high-speed I/O bus for connecting peripherals to memory 720, a chipset, and processor 702. Examples may include, without limitation, audio controller 729, firmware hub 728 (e.g., flash BIOS), transceiver 726, a data storage 724, legacy I/O controller 723 containing user input interface 725, and a keyboard interface, serial expansion port 727, such as a USB, and network controller 734. Data storage 724 may comprise a hard disk drive, a floppy disk drive, a CD-ROM device, a flash memory device, or other mass storage device. In an embodiment, transceiver 726 includes a constrained FFE 708.

In at least one embodiment, FIG. 7 illustrates a system including interconnected hardware devices or "chips" in transceiver 726—e.g., transceiver 726 includes a chip-to-chip interconnect including a first device and a second device (e.g., device 110 and device 112, respectively, as described with reference to FIG. 1). In at least one embodiment, FIG. 7 may illustrate an exemplary SoC. In at least one embodiment, devices illustrated in FIG. 7 may be interconnected with proprietary interconnects, standardized interconnects (e.g., PCIe), or some combination thereof. In at least one embodiment, one or more components of computer system 700 are interconnected using compute express link ("CXL") interconnects. In an embodiment, transceiver 726 can include processing circuitry 132 as described with reference to FIG. 1. In such embodiments, processing circuitry 132 can facilitate a method to implement dynamic lane assignments in an optical sub-system.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more of individual non-transitory storage media of multiple non-transitory computer-readable storage media lack all of the code, while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein, and such computer systems are configured with applicable hardware and/or software that enable the performance of operations. Further, a computer system that implements at least one embodiment of present disclosure is a single device and, in another embodiment, is a distributed computer system comprising multiple devices that operate differently such that the distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to actions and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transforms that electronic data into other electronic data that may be stored in registers and/or memory. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously, or intermittently. In at least one embodiment, terms "system" and "method" are used herein interchangeably insofar as the system may embody one or more methods, and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. An optical sub-system comprising:
   an optical interface comprising a first quantity of a first set of lanes; and
   a processing device operatively coupled to the optical interface, the processing device to perform operations comprising:
   responsive to a first optical module coupling to a first port of the optical interface, determining first module information from the first optical module, the first module information identifying a second quantity of a second set of lanes of the first optical module;
   determining, based on the first module information, a first communication mode between the optical interface and the first optical module; and
   automatically assigning, based on the first communication mode, a first lane of the first set of lanes to a second lane of the second set of lanes.

2. The optical sub-system of claim 1, wherein a subset of lanes of the first set of lanes is automatically assigned to the second set of lanes, the subset of lanes comprising the first lane.

3. The optical sub-system of claim 1, wherein determining the first communication mode comprises:
   responsive to determining that the first quantity of lanes is equal to or greater than the second quantity of lanes, selecting a first lane mapping scheme of a plurality of lane mapping schemes based on the second quantity of lanes; and
   using the first lane mapping scheme to indicate the first communication mode.

4. The optical sub-system of claim 3, wherein the first lane mapping scheme is configurable by a user.

5. The optical sub-system of claim 3, the operations further comprising:
   responsive to determining that the first quantity of lanes is less than the second quantity of lanes, selecting a second lane mapping scheme of the plurality of lane mapping schemes based on the first quantity of lanes; and
   using the second lane mapping scheme to indicate the first communication mode.

6. The optical sub-system of claim 1, wherein determining the first module information from the first optical module comprises:
   reading the first module information of the first optical module from a memory of the first optical module.

7. The optical sub-system of claim 1, wherein the first communication mode is a pulse-amplitude modulation (PAM) communication mode, and the first optical module is a pulse-amplitude modulation (PAM) optical module.

8. The optical sub-system of claim 1, wherein the first communication mode is a non-return-to-zero (NRZ) communication mode, and the first optical module is a non-return-to-zero (NRZ) optical module.

9. The optical sub-system of claim 1 further comprising:
a plurality of serializer/deserializer (SerDes) components, wherein each lane of the first set of lanes is coupled to a SerDes component of the plurality of SerDes components.

10. The optical sub-system of claim 1, the operations further comprising:
responsive to a second optical module coupling to a second port of the optical interface, determining second module information from the second optical module, the second module information identifying a third quantity of a third set of lanes of the second optical module;
determining, based on the second module information, a second communication mode between the optical interface and the second optical module; and
automatically assigning, based on the second communication mode, a third lane of the first set of lanes to a fourth lane of the second set of lanes.

11. The optical sub-system of claim 10, wherein the second port is the first port, and wherein the first optical module is decoupled from the first port before the second optical module is coupled to the first port.

12. A method comprising:
responsive to an optical module coupling to a port of an optical interface of an optical sub-system, determining module information from the optical module, the module information identifying a first quantity of a first set of lanes of the optical module, wherein the optical interface comprises a second set of lanes;
determining, based on the module information, a communication mode between the optical interface and the optical module; and
automatically assigning, based on the communication mode, a first lane of the first set of lanes to a second lane of the second set of lanes.

13. The method of claim 12, wherein determining the communication mode comprises:
responsive to determining that a second quantity of the second set of lanes is equal to or greater than the first quantity of the first set of lanes, selecting a first lane mapping scheme of a plurality of lane mapping schemes based on the first quantity of the first set of lanes; and
using the first lane mapping scheme to indicate the communication mode.

14. The method of claim 13, wherein the first lane mapping scheme is configurable by a user.

15. The method of claim 13, further comprising:
responsive to determining that the second quantity of the second set of lanes is less than the first quantity of the first set of lanes, selecting a second lane mapping scheme of the plurality of lane mapping schemes based on the second quantity of the second set of lanes; and
using the second lane mapping scheme to indicate the communication mode.

16. The method of claim 12, wherein determining the module information from the optical module comprises:
reading the module information of the optical module from a memory of the optical module.

17. A system comprising:
an optical sub-system; and
a communication link optically coupling the optical sub-system to an optical device, the communication link comprising an optical cable coupled at a first end to a first optical module and coupled at a second end to a second optical module, wherein the first optical module is optically coupled to the optical sub-system and the second optical module is optically coupled to the optical device, and wherein the optical sub-system comprises:
an optical interface comprising a first quantity of a first set of lanes; and
a processing device operatively coupled to the optical interface, the processing device to perform operations comprising:
determining first module information from the first optical module, the first module information identifying a second quantity of a second set of lanes of the first optical module;
determining, based on the first module information, a communication mode between the optical interface and the first optical module; and
automatically assigning, based on the communication mode, a first lane of the first set of lanes to a second lane of the second set of lanes.

18. The system of claim 17, wherein determining the communication mode of the communication link comprises:
determining a third quantity of lanes of a third set of lanes of the second optical module; and
responsive to determining that the first quantity of lanes and the second quantity of lanes are greater than or equal to the third quantity of lanes, selecting the communication mode based on the third quantity of lanes.

19. The system of claim 18, the operations further comprising:
determining a fourth quantity of lanes of a fourth set of lanes of the optical device; and
responsive to determining that the first quantity of lanes and the third quantity of lanes are equal to or greater than the fourth quantity of lanes, selecting the communication mode based on the fourth quantity of lanes.

20. The system of claim 19, further comprising:
a second optical device, wherein the communication link further comprises a second optical cable coupled at a first end to the first optical module, and coupled at a second end to a third optical module, wherein the third optical module is optically coupled to the second optical device, and wherein the operations further comprise:
determining a fifth quantity of lanes, the fifth quantity of lanes comprising the fourth quantity of lanes and a sixth quantity of lanes of a fifth set of lanes of the second optical device; and
responsive to determining that the first quantity of lanes and the second quantity of lanes are greater than or equal to the fifth quantity of lanes, selecting the communication mode based on the fifth quantity of lanes.

* * * * *